United States Patent
Lee et al.

(10) Patent No.: US 12,452,546 B2
(45) Date of Patent: Oct. 21, 2025

(54) ELECTRONIC DEVICE FOR PROCESSING IMAGES AND METHOD FOR OPERATING SAME

(71) Applicant: SAMSUNG ELECTRONICS CO., LTD., Suwon-si (KR)

(72) Inventors: Changwoo Lee, Suwon-si (KR); Dohan Kim, Suwon-si (KR); Kwanho Kim, Suwon-si (KR); Jaehun Cho, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 412 days.

(21) Appl. No.: 18/102,645

(22) Filed: Jan. 27, 2023

(65) Prior Publication Data

US 2023/0179872 A1 Jun. 8, 2023

Related U.S. Application Data

(63) Continuation of application No. PCT/KR2021/008415, filed on Jul. 2, 2021.

(30) Foreign Application Priority Data

Jul. 30, 2020 (KR) .................. 10-2020-0095206

(51) Int. Cl.
*H04N 23/741* (2023.01)
*G06T 1/60* (2006.01)
(Continued)

(52) U.S. Cl.
CPC ............ *H04N 23/741* (2023.01); *G06T 1/60* (2013.01); *G06T 5/50* (2013.01); *H04N 23/73* (2023.01);
(Continued)

(58) Field of Classification Search
CPC ........ H04N 23/741; H04N 23/73; G06T 1/60; G06T 5/50; G06T 2207/10144; G06T 2207/20208; G06T 2207/20221
(Continued)

(56) References Cited

U.S. PATENT DOCUMENTS

| | | |
|---|---|---|
| 8,358,319 B2 | 1/2013 | Cote et al. |
| 8,754,904 B2 | 6/2014 | Bakalash et al. |

(Continued)

FOREIGN PATENT DOCUMENTS

| | | |
|---|---|---|
| CN | 107343140 A | 11/2017 |
| KR | 20110138114 A | 12/2011 |

(Continued)

OTHER PUBLICATIONS

International Search Report and Written Opinion for International Application No. PCT/KR2021/008415; International Filing Date Jul. 2, 2021; Date of Mailing Sep. 27, 2021; 56 Pages.

(Continued)

*Primary Examiner* — Allen H Nguyen
(74) *Attorney, Agent, or Firm* — CANTOR COLBURN LLP

(57) ABSTRACT

Various embodiments of the present invention relate to an apparatus and method for processing images in an electronic device. The electronic device includes: a memory; an image sensor; an image control circuit operatively connected to the image sensor; and an image signal processor operatively coupled to the image control circuit. The image control circuit can store a plurality of frames received through the image sensor in the memory, transmit the plurality of frames stored in the memory to the image signal processor, and, when the number of frames that have not been transmitted to the image signal processor among the plurality of frames obtained from the image sensor exceeds a designated num- (Continued)

ber, remove the frames that have not been transmitted to the image signal processor from the memory.

17 Claims, 13 Drawing Sheets

(51) Int. Cl.
  *G06T 5/50* (2006.01)
  *H04N 23/73* (2023.01)
(52) U.S. Cl.
  CPC ............... *G06T 2207/10144* (2013.01); *G06T 2207/20208* (2013.01); *G06T 2207/20221* (2013.01)
(58) Field of Classification Search
  USPC ........................................................ 382/274
  See application file for complete search history.

(56) References Cited

U.S. PATENT DOCUMENTS

| | | | |
|---|---|---|---|
| 9,479,695 | B2 | 10/2016 | Lim et al. |
| 10,148,888 | B2 | 12/2018 | Dabral et al. |
| 10,361,816 | B2* | 7/2019 | Sakai ................... H04L 1/0057 |
| 10,600,236 | B2 | 3/2020 | Leiby et al. |
| 10,679,320 | B1 | 6/2020 | Kunz |
| 11,094,043 | B2 | 8/2021 | Kalantari et al. |
| 2010/0295868 | A1* | 11/2010 | Zahnert .............. H04N 1/19505 382/284 |
| 2011/0310970 | A1 | 12/2011 | Lee et al. |
| 2012/0002082 | A1 | 1/2012 | Johnson et al. |
| 2012/0081567 | A1 | 4/2012 | Côté et al. |
| 2012/0081578 | A1 | 4/2012 | Cote et al. |
| 2012/0188392 | A1 | 7/2012 | Smith |
| 2012/0314100 | A1 | 12/2012 | Frank |
| 2014/0086446 | A1 | 3/2014 | Han et al. |
| 2016/0035073 | A1 | 2/2016 | Park |
| 2016/0065821 | A1 | 3/2016 | Barna et al. |
| 2016/0301846 | A1 | 10/2016 | Mobbs et al. |
| 2018/0338078 | A1 | 11/2018 | Cote et al. |
| 2019/0052790 | A1 | 2/2019 | Kang et al. |
| 2019/0116304 | A1 | 4/2019 | Hasinoff et al. |
| 2020/0219240 | A1 | 7/2020 | Kang et al. |
| 2021/0082330 | A1* | 3/2021 | Bae ........................ G09G 5/00 |

FOREIGN PATENT DOCUMENTS

| | | | |
|---|---|---|---|
| KR | 20120061032 | A | 6/2012 |
| KR | 20130033446 | A | 4/2013 |
| KR | 20140039920 | A | 4/2014 |
| KR | 20190017303 | A | 2/2019 |
| KR | 20200085523 | A | 7/2020 |

OTHER PUBLICATIONS

Korean Office Action, Application No. 10-2020-0095206 filed Jul. 30, 2020; mailed Jul. 11, 2025; 7 pages, with English Translation.

* cited by examiner

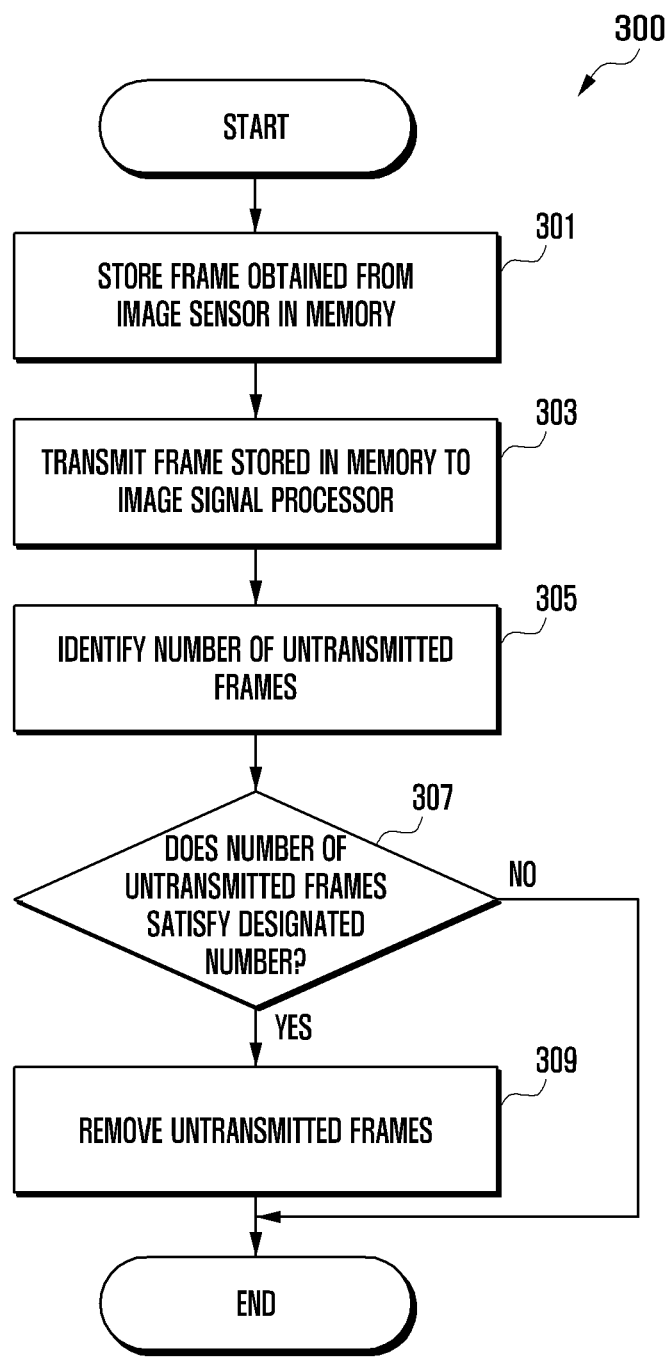

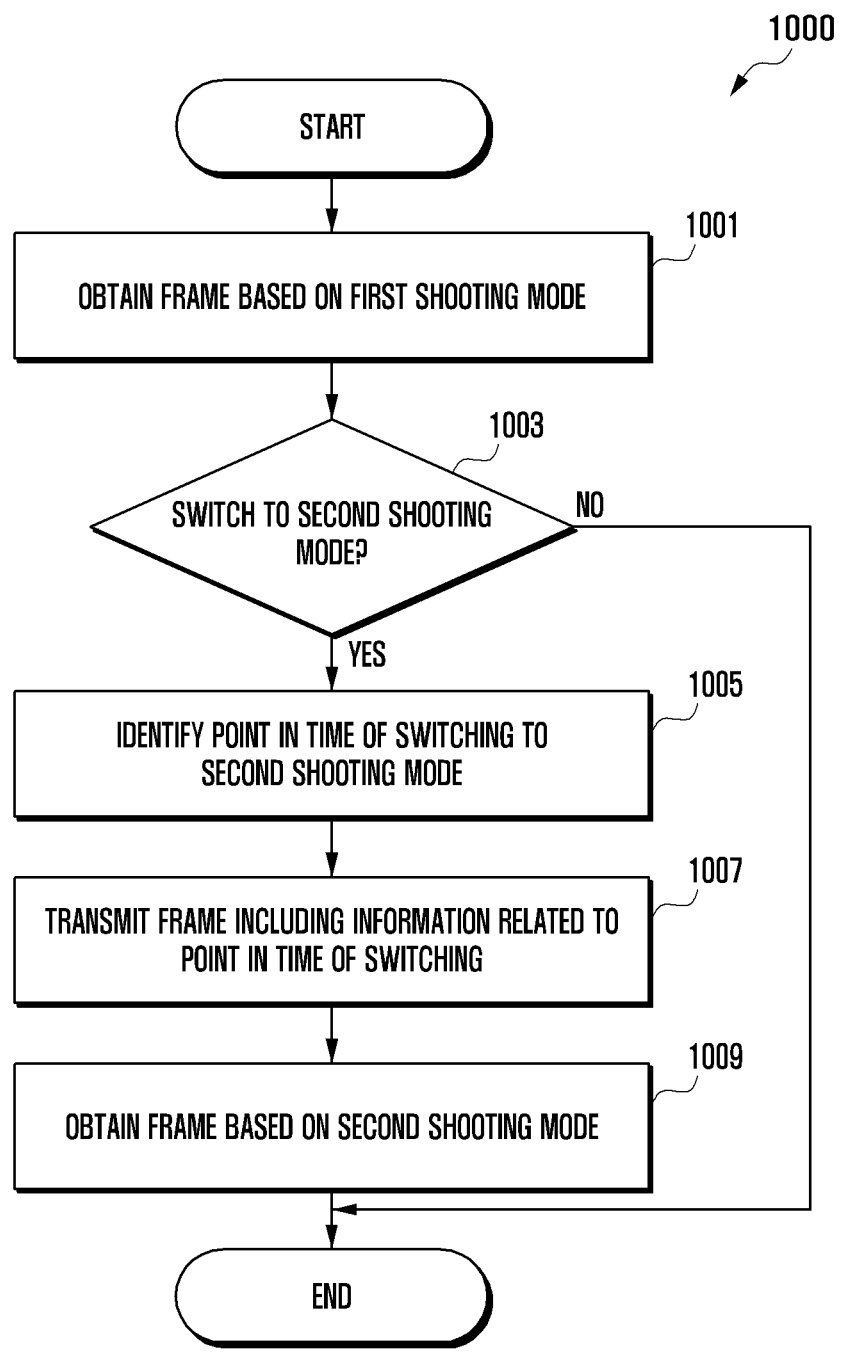

ELECTRONIC DEVICE FOR PROCESSING IMAGES AND METHOD FOR OPERATING SAME

CROSS-REFERENCE TO RELATED APPLICATION(S)

This application is based on and claims priority under 35 U.S.C. § 120 to PCT International Application No. PCT/KR2021/008415, which was filed on Jul. 2, 2021, and claims priority to Korean Patent Application No. 10-2020-0095206, filed on Jul. 30, 2020, in the Korean Intellectual Property Office, the disclosure of which are incorporated by reference herein their entirety.

BACKGROUND

Technical Field

Various embodiments of the disclosure relate to a method and apparatus for processing an image in an electronic device.

Description of Related Art

A dynamic range (DR) of an image may be defined by a ratio of the brightest pixel value and the darkest pixel value in the image. The eyes of a human can perceive a relatively higher dynamic range than an image sensor or a display of a normal electronic device. Accordingly, an electronic device is incapable of obtaining or expressing an image of a dynamic range that a human perceives. For example, in the case that an electronic device shoots an image of an area where a high illumination area (a significantly bright area) and a low illumination area (a significantly dark area) coexist, such as shooting of a backlit image, an electronic device may obtain an image in which information associated with a high illumination area or a low illumination area is omitted. In addition, an image obtained via an electronic device is incapable of expressing the feeling of color or a tone (or brightness) that a human perceives.

An electronic device may provide an image having a high dynamic range (HDR) capable of expressing an image making an impression similar to an image that a human may perceive, in order to provide an image having quality that a user desires.

SUMMARY

An image having a high dynamic range (HDR) may be produced by combining a short exposure frame obtained via a relatively short exposure for a relatively bright portion and a long exposure frame obtained via a relatively long exposure for a relatively dark portion. For example, an image having a high dynamic range may obtain a relatively bright part from a short exposure frame and may obtain a relatively dark part from a long exposure frame, thereby obtaining a generally clear image even in the case of an image having a relatively high difference in brightness.

Due to a ghost effect or a rolling effect caused by the difference between the point in time at which a short exposure frame is obtained and the point in time at which a long exposure frame is obtained, the quality of an image having a high dynamic range may deteriorate.

The electronic device may obtain a short exposure frame and a long exposure frame within a relatively short period of time via an image sensor to reduce the deterioration of the quality of an image, thereby reducing the difference in the point in time of obtaining a frame between the short exposure frame and the long exposure frame. In this instance, the electronic device may need a scheme of processing frames obtained at high speed to combine the frames into an image having a high dynamic range. Various embodiments of the disclosure provide a method and apparatus for processing a plurality of frames obtained from an image sensor for multi-frame combination in an electronic device.

According to various embodiments, an electronic device may include a memory, an image sensor, an image control circuit operatively connected to the image sensor, and an image signal processor operatively connected to the image control circuit, wherein the image control circuit may be configured to store a plurality of frames received via the image sensor in the memory, to transmit the plurality of frames stored in the memory to the image signal processor, and to remove a frame that is not transmitted to the image signal processor from the memory in the case the number of frames that are not transmitted to the image signal processor among the plurality of frames received from the image sensor exceeds a designated number.

According to various embodiments, an operation method of an electronic device may include an operation of storing a plurality of frames obtained via an image sensor of the electronic device in a memory of the electronic device, an operation of transmitting the plurality of frames stored in the memory to an image signal processor, and in the case that the number of frames that are not transmitted to the image signal processor among the plurality of frames obtained from the image sensor exceeds a designated number, an operation of removing the frames that are not transmitted to the image signal processor from the memory.

According to various embodiments of the disclosure, an electronic device may store a frame obtained from an image sensor using an image control circuit in a memory, and may transmit at least one frame stored in the memory to an image signal processor based on a processing rate of the image signal processor (ISP), thereby combining frames having different exposures and obtaining an image having a high dynamic range (HDR).

According to various embodiments, an image sensor of an electronic device may transmit a frame by adding information related to the point in time of switching a shooting mode to the frame and thus an image control circuit and/or an image signal processor is capable of processing a frame obtained from the image sensor based on the switched shooting mode.

BRIEF DESCRIPTION OF THE DRAWINGS

FIG. 3 is a flowchart for controlling at least some of frames received from an image sensor, by an image control circuit according to various embodiments.

FIG. 10 is a flowchart for providing information related to switching a shooting mode by an image sensor according to various embodiments.

DETAILED DESCRIPTION

Hereinafter, various embodiments will be described in detail with reference to attached drawings.

Figure 1:
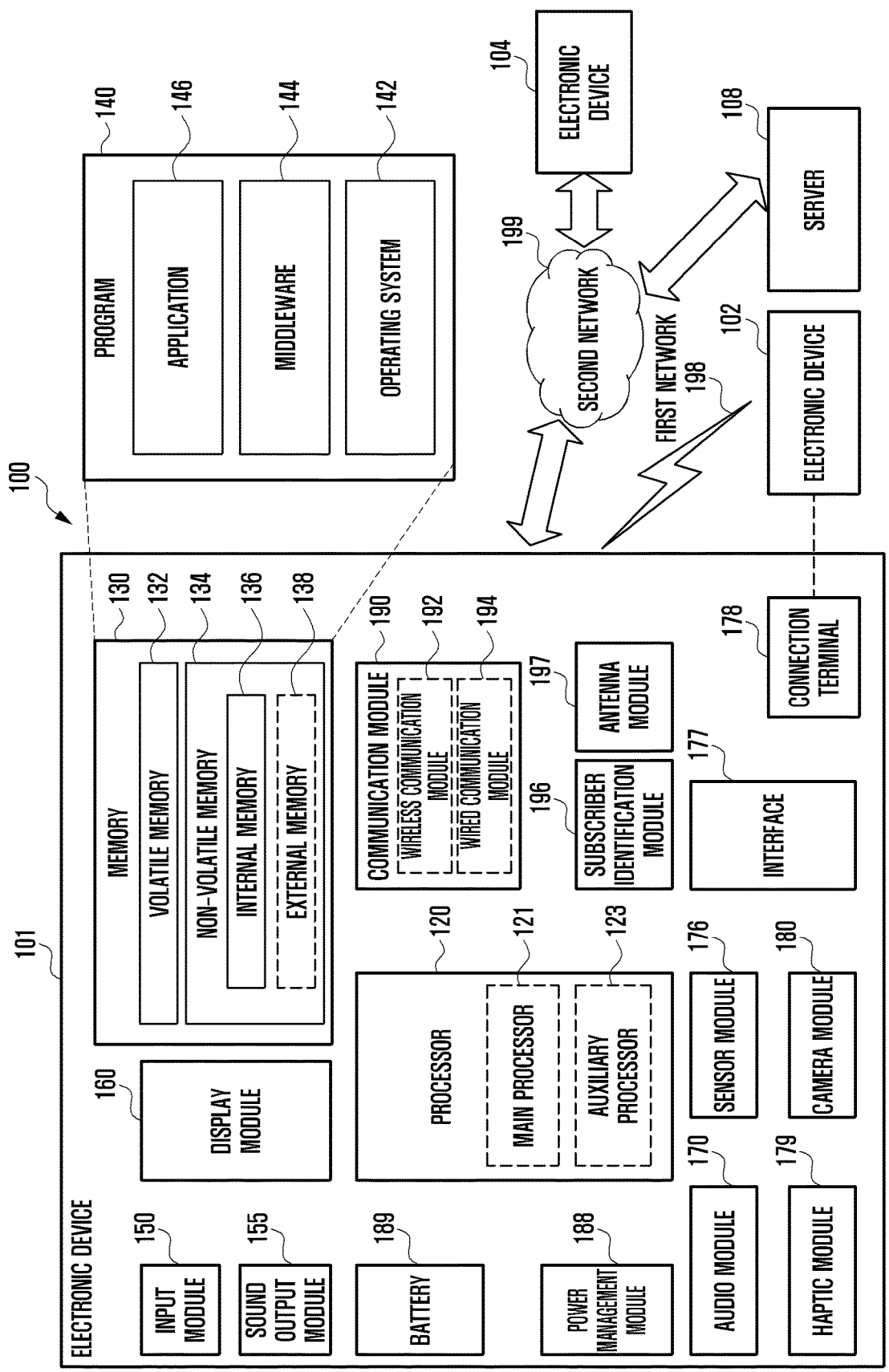
FIG. 1 is a block diagram of an electronic device according to various embodiments of the disclosure.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. In various embodiments, at least one of the components (e.g., the connection terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). According to an embodiment, the connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC. According to an embodiment, the subscriber identification module 196 may include a plurality of subscriber identification modules. For example, the plurality of subscriber identification modules may store different subscriber information.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
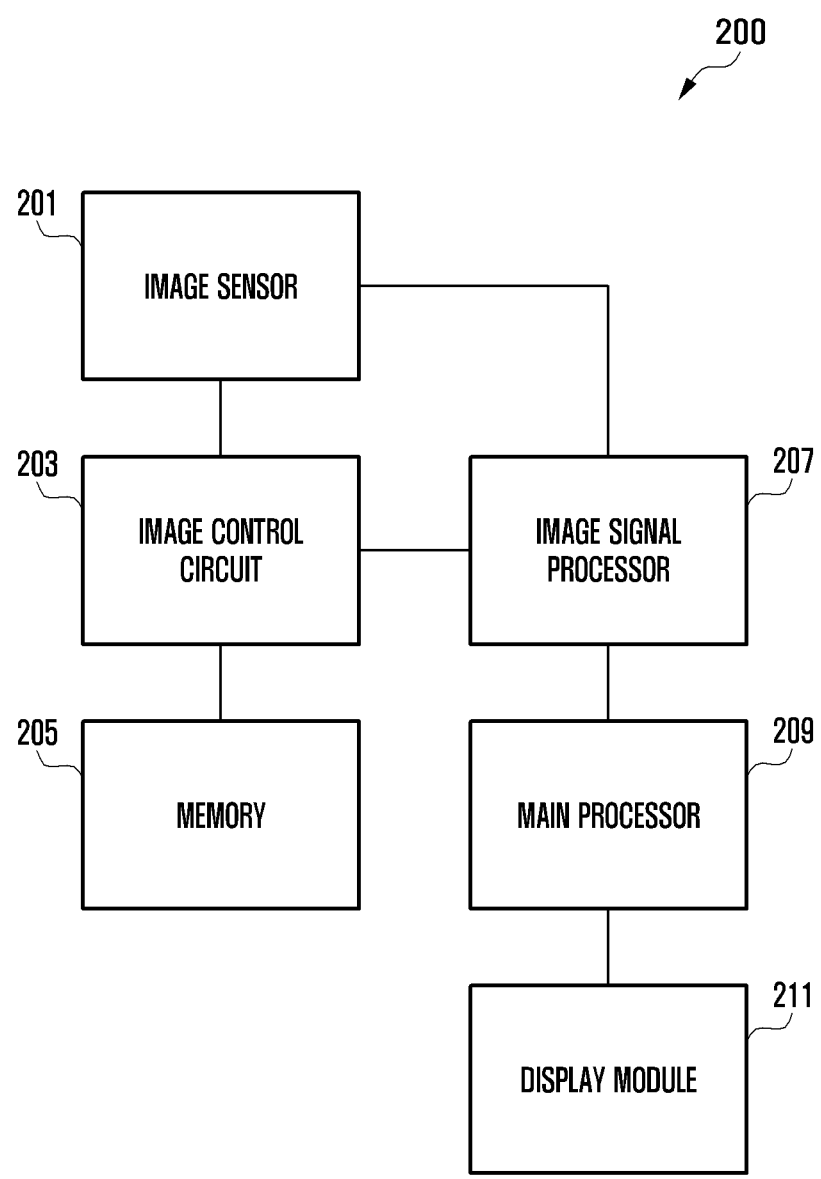
FIG. 2 is a block diagram of an electronic device for image processing according to various embodiments.

FIG. 2 is a block diagram of an electronic device for image processing according to various embodiments. According to an embodiment, the electronic device 200 of FIG. 2 may be at least partially similar to the electronic device 101 of FIG. 1, or may further include other embodiments of an electronic device.

Referring to FIG. 2, according to various embodiments, the electronic device 200 may include an image sensor 201, an image control circuit 203, a memory 205, an image signal processor (ISP) 207, a main processor 209, and/or a display module 211. According to an embodiment, the image sensor 201 may be substantially the same as the camera module 180 of FIG. 1, or may be included in the camera module 180. The memory 205 may be substantially the same as the memory 130 of FIG. 1, or may be included in the memory 130. The main processor 209 may be substantially the same as the main processor 121 of FIG. 1, or may be included in the main processor 121. The display module 211 may be substantially the same as the display module 160 of FIG. 1, or may be included in the display module 160.

According to various embodiments, the image signal processor 207 may be substantially the same as the sub-processor 123 of FIG. 1, or may be included in the sub-processor 123. According to various embodiments, the image signal processor 207 may be substantially the same as the camera module 180 of FIG. 1, or may be included in the camera module 180. According to various embodiments, the image signal processor 207 may be included in the main processor 209, or may be configured as a processor separate from the main processor 209.

According to various embodiments, the image control circuit 203 may be embodied as hardware or software. According to an embodiment, the image control circuit 203 may be hardware separate from the image signal processor 207, and may be electrically and/or operatively connected to the image signal processor 207. According to an embodiment, the image control circuit 203 may be included in the same chip set or the same package together with the image signal processor 207. According to an embodiment, the image control circuit 203 may be embodied as some of the component elements (e.g., a processor core) of the image signal processor 207. According to an embodiment, the image control circuit 203 may be included in the image signal processor 207. For example, the image control circuit 203 may be embodied as software (e.g., firmware) executed in the image signal processor 207.

According to various embodiments, the image sensor 201 may detect light reflected from a subject, and may convert the same into an electric image signal. According to an embodiment, the image sensor 201 may obtain frames having different exposures during a single frame interval (e.g., $1/30$ seconds). For example, the image sensor 201 may obtain a long exposure frame and a short exposure frame within a single frame interval, and may output the same to the image control circuit 203. For example, a long exposure frame and a short exposure frame may be obtained successively. For example, the image sensor 201 may be restricted from outputting a frame during an interval (e.g., approximately $1/60$ seconds) remaining after excluding a first shooting interval (e.g., approximately $1/120$ seconds) for obtaining a long exposure frame and a second shooting interval (e.g., approximately $1/120$ seconds) for obtaining a short exposure frame in a single frame interval. As another example, the image sensor 201 may output at least one frame of a medium exposure during an interval remaining after excluding a first shooting interval and a second shooting interval in a single frame interval. As another example, the image sensor 201 may obtain a long exposure frame during a first shooting interval (e.g., approximately $1/120$ seconds) in a single frame interval and may output the same to the image control circuit 203. After a second shooting interval (e.g., approximately $1/120$ seconds) elapses, the image sensor 201 may obtain a short exposure frame during a third shooting interval (e.g., approximately $1/120$ seconds) and may output the same to the image control circuit 203. For example, a frame interval may include a time interval (e.g., approximately $1/30$ seconds) in which a single image (e.g., an image having a high dynamic range) is output to the outside via the display module 211 based on the number of frames per second (FPS) (e.g., 30 FPS) related to driving of an application program. For example, a shooting interval may include a time interval in which the image sensor 201 obtains a single frame (e.g., a long exposure frame, a short exposure frame, or a medium exposure frame) and transmits the same to the image control circuit 203. For example, in the case of a first mode (e.g., a single frame mode), the frame interval may include at least one shooting interval. For example, in the case of a second mode (e.g., a multi-frame mode), the frame interval may include at least two shooting intervals (e.g., a first shooting interval and a second shooting interval).

According to various embodiments, the image sensor 201 may provide information related to the point in time of switching of a shooting mode to at least one component element (e.g., the image control circuit 203 or the image signal processor 207) of the electronic device 200. For example, a shooting mode may be distinguished based on the number of frames that the image sensor 201 obtains during a single frame interval. For example, the shooting mode may include a single frame mode and a multi-frame mode. For example, the single frame mode may include an operation of obtaining a single frame during a single frame interval by the image sensor 201. For example, the multi-frame mode may include an operation of obtaining multiple (e.g., two) frames during a single frame interval by the image sensor 201. For example, the shooting mode may be an operation itself in which the image sensor 201 obtains a frame.

According to an embodiment, in the case that the image sensor 201 receives a signal related to switching a shooting mode (e.g., switching to a multi-frame mode) from the main processor 209 (e.g., the image signal processor 207), the image sensor 201 may determine the point in time of switching of a shooting mode based on the signal related to switching a shooting mode. The image sensor 201 may add information related to the point in time of switching of a shooting mode to a frame obtained via the image sensor 201 and may transmit the same to the image control circuit 203. For example, the image sensor 201 may add information (e.g., a flag indicating a frame at which a mode is switched to a predetermined mode and/or an indicator indicating a current mode) related to the point in time of switching of a shooting mode to a metadata area (embedded data) of a frame. For example, the multi-frame mode may include a shooting mode for obtaining frames having different exposures related to an image having a high dynamic range.

According to an embodiment, at least one component element (e.g., the image control circuit 203 or the image signal processor 207) of the electronic device 200 may recognize the point in time of switching of a shooting mode of the image sensor 201 based on information related to the point in time of switching a shooting mode included in a frame obtained from the image sensor 201. For example, in the case that information related to the point in time of switching a shooting mode is recognized from a $n^{th}$ frame received from the image sensor 201, the image control circuit 203 may recognize that a shooting mode of a frame is switched from an $(n+k)^{th}$ frame. For example, n is an index of a frame obtained from the image sensor 201 and may indicate an order of frames obtained. For example, as an interval between a frame including information related to the point in time of switching of a shooting mode and a frame in which a shooting mode is substantially switched, k may be set based on performance of an image sensor or may be set based on the type of application program related to obtaining of an image and/or requirements. As another example, in the case that information related to the point in time of switching a shooting mode is not present in a $n^{th}$ frame obtained from the image sensor 201, the image control circuit 203 may determine that a shooting mode of a frame obtained after the $n^{th}$ frame from the image sensor 201 is maintained.

According to various embodiments, the image control circuit 203 may store a frame obtained (or received) from the image sensor 201 in the memory 205. According to an embodiment, the image control circuit 203 may store a frame obtained from the image sensor 201 based on an address selected by software related to a camera module in the memory 205. For example, the software related to the camera module may select an address of the memory 205 to which a frame is to be stored. For example, the address of a memory may include a logical address, a physical address of the memory 205, or a virtual memory address. For example, the software related to the camera module may select an address at which a frame is capable of being stored among address areas allocated in association with the camera module in the memory 205.

According to an embodiment, the software related to the camera module may be at least one software (or program) that supports a camera application program (not illustrated) included in the application 146 of FIG. 1. For example, the software related to the camera module may be executed in the image processing processor 207 and/or the main processor 209. According to an embodiment, the software related to the camera module may be included in at least a part of the middleware 144 and/or operating system 142 of FIG. 1. According to an embodiment, the software related to the camera module may include a device driver related to the camera module (e.g., the image sensor 201) or a camera middleware (or a framework) that supports operation of a camera application program.

According to various embodiments, in the case that a multi-frame mode is supported, and a pair of frames (e.g., a long exposure frame and a short exposure frame) is provided from the image sensor 201 and are stored in the memory 205, the image control circuit 203 may output an interrupt signal (e.g., write interrupt (WRITE_IRQ)) related to the pair of frames. For example, an interrupt signal may be transmitted to software related to at least one camera. For example, a pair of frames may include a long exposure frame and a short exposure frame related to composition of an image having a high dynamic range. For example, based on reception of an interrupt signal related to a pair of frames from the image control circuit 203, the software related to the camera module may provide an address related to a subsequent frame to the image control circuit 203. According to an embodiment, in the case that an address selected by the software related to the camera module is not identified, the image control circuit 203 may store a frame based on the address of a previous frame stored in the memory 205. For example, the image control circuit 203 may store a long exposure frame of a first frame interval in the memory 205 based on an address selected by the software related to the camera module. In the case that an address related to a short exposure frame is not identified, the image control circuit 203 may store a short exposure frame in a subsequent storage area (or a consecutive storage area) of a storage area where a long exposure frame is stored in the memory 205.

According to various embodiments, the image control circuit 203 may transmit at least one frame stored in the memory 205 to the image signal processor 207 based on a frame processing rate of the image signal processor 207. According to an embodiment, the image control circuit 203 may transmit at least one frame stored in the memory 205 to the image signal processor 207 so that a preview image corresponding to the number of frames per second (FPS) related to driving of an application program (e.g., a camera application program) is output. According to an embodiment, in the case that a multi-frame mode is supported, the image control circuit 203 may transmit a pair of frames (e.g., a long exposure frame and a short exposure frame) to the image signal processor 207 during a single frame interval. For example, the image control circuit 203 may successively transmit a pair of frames (e.g., a long exposure frame and a short exposure frame) to the image signal processor 207 during a single frame interval. According to an embodiment, the image control circuit 203 may remove (or discard) a frame transmitted to the image signal processor 207 from the memory 205.

According to an embodiment, the image control circuit 203 may transmit at least two frames (e.g., a long exposure frame and a short exposure frame) related to an image having a high dynamic range among a plurality of frames obtained from the image sensor 201 during a single frame interval to the image signal processor 207. For example, the image control circuit 203 may be restricted from transmitting a remaining frame (e.g., a frame not related to a preview image) that is not related to an image having a high dynamic range among the plurality of frames obtained from the image sensor 201 during a single frame interval to the image signal processor 207.

According to various embodiments, in the case that the number of frames that are not transmitted to the image signal processor 207 among the frames obtained from the image sensor 201 satisfies a designated number, the image control circuit 203 may remove (drop) the frames that are not transmitted to the image signal processor 207. For example, in the case that a pair of frames to be transmitted to the image signal processor 207 is identified in the memory 205, the image control circuit 203 may identify the number of frames that are not transmitted to the image signal processor 207 among the frames obtained from the image sensor 201. In the case that the number of frames that are not transmitted to the image signal processor 207 satisfies a designated number, the image control circuit 203 may remove the frames that are not transmitted to the image signal processor 207 from the memory 205. For example, the case in which the designated number is satisfied may include the case in which the number of frames that are not transmitted to the image signal processor 207 exceed the designated number. For example, the number of frames that are not transmitted (e.g., untransmitted frames) to the image signal processor 207 may be detected based on the difference between the number of frames obtained from the image sensor 201 and the number of frames transmitted to the image signal processor 207. For example, the number of frames obtained from the image sensor 201 may be identified based on the index of a frame obtained from the image sensor 201 (e.g., the index of a frame obtained last). For example, the number of frames transmitted to the image signal processor 207 may be identified based on the index of a frame transmitted to the image signal processor 207 (e.g., the index of a frame transmitted last). For example, the index of a frame may be sequentially assigned in order of frames obtained via the image sensor 201. For example, the number of frames that are not transmitted to the image signal processor 207 may include the number of frames or the number of frame pairs that are not transmitted to the image signal processor 207 among the plurality of frames related to an image having a high dynamic range and obtained from the image sensor 201.

According to various embodiments, the memory 205 may store a frame obtained from the image sensor 201 according to control performed by the image control circuit 203. For example, the memory 205 may support a first in first out scheme. According to an embodiment, the memory 205 may be included in the same chip set or the same package together with the image control circuit 203. According to an embodiment, the memory 205 is hardware separate from the image control circuit 203, and may be electrically and/or operatively connected to the image control circuit 203.

According to various embodiments, the image signal processor 207 may produce an image having a high dynamic range by combining a pair of frames (e.g., a long exposure frame and a short exposure frame) obtained (or received) from the image control circuit 203. According to an embodiment, in the case that information related to the point in time of switching a shooting mode is recognized in a $n^{th}$ frame obtained from the image control circuit 203, the image signal processor 207 may recognize that the shooting mode of a frame is changed from an $(n+k)^{th}$ frame. For example, the image signal processor 207 may produce an image having a high dynamic range by combining a pair of frames (e.g., $(n+k)^{th}$ frame and $(n+(k+1))^{th}$ frame) from the $(n+k)^{th}$ frame.

According to various embodiments, the main processor 209 may execute an application program. According to an embodiment, in the case that an application program (e.g., a camera application program) that a user desires is executed, the main processor 209 may control at least one other component elements (e.g., the image sensor 201, the image control circuit 203, the image signal processor 207, and/or the display module 211) related to the application program. For example, if it is determined to perform shooting using an image having a high dynamic range based on user input or setting of a camera application program, the main processor 209 may transmit a message related to switching to a multi-frame mode to the image sensor 201. For example, the main processor 209 may control the display module 211 to display an image having a high dynamic range produced by the image signal processor 207.

According to various embodiments, the display module 211 may display information processed in the electronic device 200. According to an embodiment, the display module 211 may display an image having a high dynamic range (e.g., a preview image) produced by the image signal processor 207.

According to various embodiments, the image control circuit 203 may remove at least some frames among the frames that are not transmitted to the image signal processor 207 from the memory 205. According to an embodiment, in the case that the number of frames that are not transmitted to the image signal processor 207 satisfies a designated number, the image control circuit 203 may select at least one frame based on an order of frames stored (or obtained), importance, and/or the point in time at which a frame is obtained in association with the frames that are not transmitted to the image signal processors 207. The image control circuit 203 may delete at least one frame from the memory 205. For example, the remaining frames that are not deleted among the frames that are not transmitted to the image signal processor 207 may be transmitted to the image signal processor 207 when the point in time of transmission arrives.

According to various embodiments, an electronic device (e.g., the electronic device 101 of FIG. 1 or the electronic device 200 of FIG. 2) may include a memory (e.g., the memory 130 of FIG. 1 or the memory 205 of FIG. 2), an image sensor (e.g., the camera module 180 of FIG. 1 or the image sensor 201 of FIG. 2), an image control circuit (e.g., the memory 130 of FIG. 1 or the memory 205 of FIG. 2) operatively connected to the image sensor, and an image signal processor (ISP) (e.g., the sub-processor 123 of FIG. 1 or the image signal processor 207 of FIG. 2) operatively connected to the image control circuit, and the image control circuit may be configured to store a plurality of frames received (or obtained) via the image sensor in the memory, to transmit the plurality of frames stored in the memory to the image signal processor, and to remove, from the memory, a frame that is not transmitted to the image signal processor in the case that the number of frames that are not transmitted to the image signal processor among the plurality of frames received from the image sensor exceeds a designated number.

According to various embodiments, the image control circuit may be configured to transmit a first frame corresponding to a first exposure and a second frame corresponding to a second exposure different from the first exposure, which are related to image composition from among the plurality of frames received from the image sensor during a first frame interval, to the image signal processor.

According to various embodiments, the image control circuit may be configured to restrict transmission of at least one third frame that corresponds to a third exposure different from the first exposure and the second exposure to the image signal processor from among the plurality of frames received from the image sensor during the first frame interval.

According to various embodiments, in the case that the first frame corresponding to the first exposure and the second frame corresponding to the second exposure different from the first exposure, which are received from the image sensor during the first frame interval, are stored in the memory, the image control circuit is configured to produce an interrupt signal related to storing of the first frame and the second frame.

According to various embodiments, the image signal processor may be configured to select an address of the memory related to storing of a subsequent frame based on the interrupt signal, and the image control circuit may be configured to store a fourth frame corresponding to the first exposure and a fifth frame corresponding to the second exposure, which are received from the image sensor during a second frame interval, in the memory based on the address selected by the image signal processor.

According to various embodiments, in the case that a frame to be transmitted to the image signal processor from among the frames stored in the memory is identified, the image control circuit may be configured to identify a difference between an index of a frame received from the image sensor and an index of a frame transmitted to the image signal processor, and to remove, from the memory, a frame that is not transmitted to the image signal processor among the plurality of frames obtained from the image sensor in the case that the difference between the index of the frame received from the image sensor and the index of the frame transmitted to the image signal processor exceeds the designated number.

According to various embodiments, when the number of frames that are not transmitted to the image signal processor among the plurality of frames received from the image sensor is less than or equal to the designated number, the image control circuit is configured to sequentially transmit the plurality of frames received from the image sensor in order of frames received (or obtained).

According to various embodiments, the image sensor may add information related to an exposure of a subsequent frame to the first frame, and the image control circuit may detect the information related to an exposure of a subsequent frame to be received from the image sensor from the first frame.

According to various embodiments, the image signal processor may be configured to produce a single image by combining the first frame corresponding to the first exposure and the second frame corresponding to the second exposure different from the first exposure, which are provided from the image control circuit.

According to various embodiments, the image signal processor may further include a display module that displays the image produced by the image signal processor.

Figure 4A:
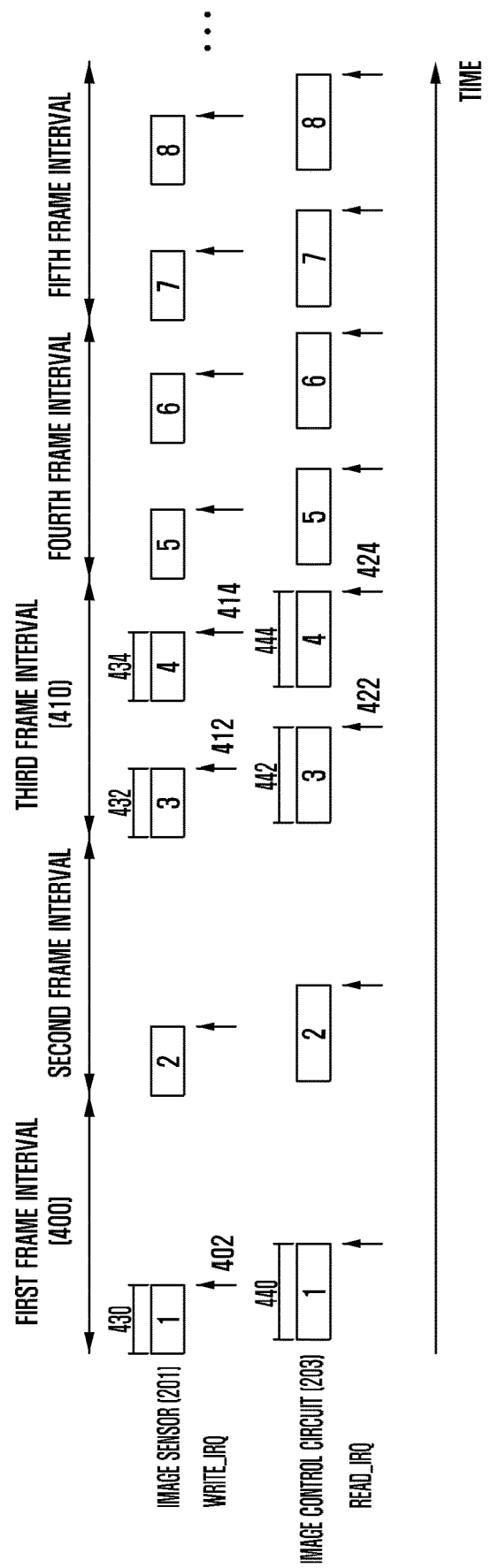
FIGS. 4A and 4B are diagrams illustrating examples of storing and outputting a frame received from an image sensor by an image control circuit according to various embodiments.
Figure 4B:
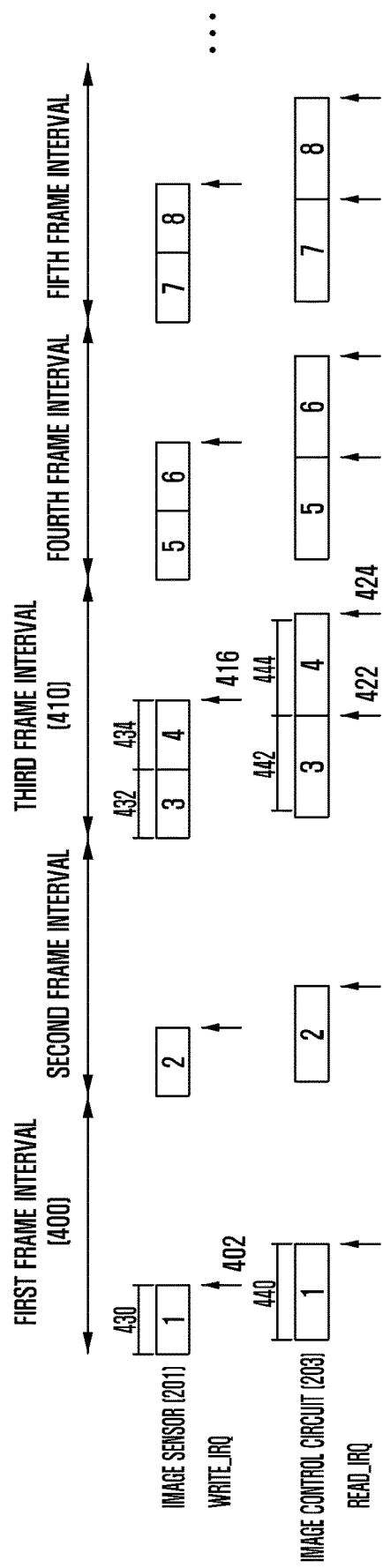
Figure 5:
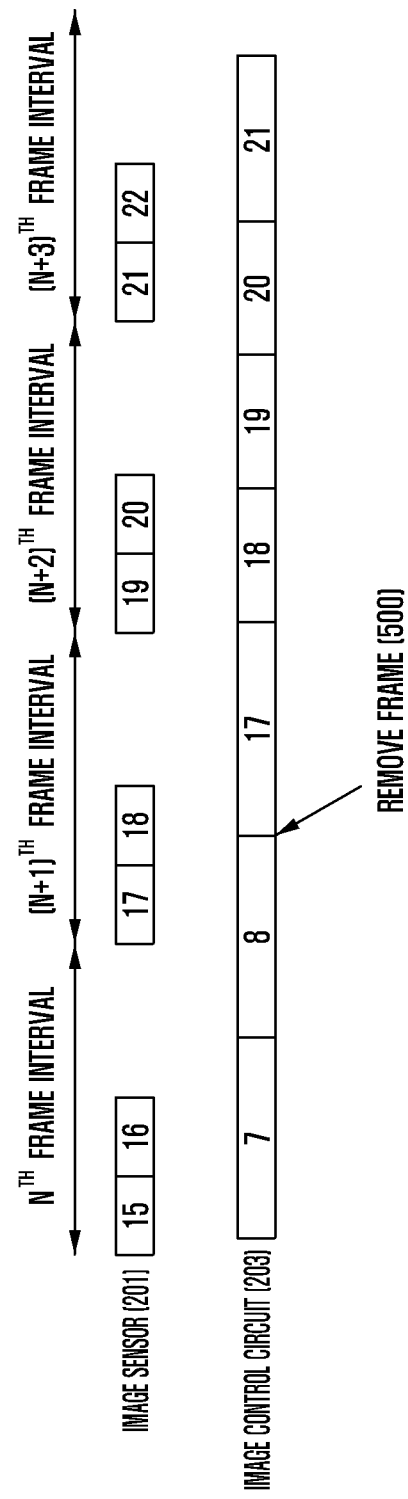
FIG. 5 is a diagram illustrating an example of controlling at least some of frames received from an image sensor by an image control circuit according to various embodiments.

FIG. 3 is a flowchart 300 for controlling at least some of the frames obtained from an image sensor in an image control circuit according to various embodiments. In the embodiment provided hereinafter, operations may be performed sequentially, but it is not necessary. For example, the order of operations may be changed, and at least two operations may be performed in parallel. For example, an electronic device of FIG. 3 may be the electronic device 101 of FIG. 1 or the electronic device 200 of FIG. 2. For example, an image control circuit of FIG. 3 may be the image control circuit 203 of FIG. 2. For example, at least a part of the configuration of FIG. 3 will be described with reference to FIGS. 4A, 4B, and 5. FIGS. 4A and 4B are diagrams illustrating examples of storing and outputting a frame obtained from an image sensor by an image control circuit according to various embodiments. FIG. 5 is a diagram illustrating an example of controlling at least some of the frames obtained from an image sensor by an image control circuit according to various embodiments.

Referring to FIG. 3, according to various embodiments, the electronic device (e.g., the image control circuit 203 of FIG. 2) may store a frame obtained from an image sensor (e.g., the camera module 180 of FIG. 1 or the image sensor 201 of FIG. 2) in a memory (e.g., the memory 130 of FIG. 1 or the memory 205 of FIG. 2) in operation 301. According to an embodiment, in the case that operation is performed in a single frame mode (e.g., in the case that a camera application program performs shooting based on a single frame mode), the image control circuit 203 may store a first frame obtained via the image sensor 201 during a first frame interval 400 as illustrated in FIG. 4A or 4B in the memory 205. For example, in the case that storing of the first frame in the memory 205 is completed, the image control circuit 203 may output an interrupt signal 402 (e.g., write interrupt (WRITE IRQ)) related to storing of the first frame. For example, a frame interval may include a time interval (e.g., approximately $1/30$ seconds) in which a single image (e.g., an image having a high dynamic range) needs to be output based on the number of frames per second (e.g., 30 FPS) related to driving of an application program. For example, the image sensor 201 may obtain a first frame during a first shooting interval 430 (e.g., approximately $1/120$ seconds) in the first frame interval 400 and may output the same to the image control circuit 203.

According to an embodiment, in the case that the image control circuit 203 operates in a multi-frame mode (e.g., in the case that a camera application program performs shooting based on a multi-frame mode), the image control circuit 203 may store a pair of frames (e.g., a third frame and a fourth frame) obtained via the image sensor 201 during a third frame interval 410 as illustrated in FIG. 4A or 4B in the memory 205. For example, as illustrated in FIG. 4A, in the case that storing of the third frame in the memory 205 is completed, the image control circuit 203 may output an interrupt signal 412 related to storing of the third frame, and in the case that storing of the fourth frame is completed, the image control circuit 203 may output an interrupt signal 414 related to storing of the fourth frame. As another example, as illustrated in FIG. 4B, in the case that storing of a pair of frames (e.g., the third frame and the fourth frame) in the memory 205 is completed, the image control circuit 203 may output an interrupt signal 416 related to storing of the pair of frames (e.g., the third frame and the fourth frame). For example, the third frame and the fourth frame may include frames (e.g., a long exposure frame or a short exposure frame) having different exposures. For example, the image sensor 201 may obtain the third frame during a second shooting interval 432 (e.g., approximately $1/120$ seconds) in the third frame interval 410 and may output the same to the image control circuit 203, and may obtain the fourth frame during a third shooting interval 434 and may output the same to the image control circuit 203.

According to various embodiments, in operation 303, the electronic device (e.g., the image control circuit 203) may transmit a frame stored in the memory to the image signal processor based on a frame processing rate of an image signal processor (e.g., the sub-processor 123 of FIG. 1 or the image signal processor 207 of FIG. 2). According to an embodiment, the image control circuit 203 may transmit at least one frame stored in the memory 205 sequentially to the image signal processor 207 so that a preview image corresponding to the number of frames per second (e.g., FPS) related to driving of an application program is output. According to an embodiment, in the case that a single frame mode is supported, the image control circuit 203 may transmit a single frame (e.g., the first frame) to the image signal processor 207 during a single frame interval. For example, the image control circuit 203 may transmit the first frame to the image signal processor 207 during a first transmission interval 440. For example, the transmission interval 440 may be a time interval in which the image control circuit 203 transmits a frame stored in the memory 205 to the image signal processor 207, and may be changed based on the frame processing rate of the image signal processor 207. According to an embodiment, in the case that a multi-frame mode is supported, the image control circuit 203 may transmit a pair of frames (e.g., a long exposure frame and a short exposure frame) to the image signal processor 207 during a single frame interval. For example, a pair of frames may include frames that have different exposures and are to be combined for an image having a high dynamic range. For example, as illustrated in FIG. 4A, the image control circuit 203 may transmit the third frame among the pair of frames stored in the memory 205 to the image signal processor 207. The image control circuit 203 may transmit the fourth frame to the image signal processor 207 after a predetermined period of time elapses based on a period of time spent in processing the third frame in the image signal processor 207. For example, as illustrated in FIG. 4B, the image control circuit 203 may successively transmit the third frame and the fourth frame, which are a pair of frames stored in the memory 205, to the image signal processor 207. For example, in the case that transmission of the third frame is completed, the image control circuit 203 may output an interrupt signal 422 (e.g., a read interrupt (READ_IRQ)) related to transmission of the third frame, and in the case that transmission of the fourth frame is completed, the image control circuit 203 may output an interrupt signal 424 related to transmission of the fourth frame. According to an embodiment, in the case that the interrupt signal 422 or 424 related to frame transmission and output by the image control circuit 203 is received, software related to a camera module may prepare an operation of obtaining a subsequent frame. For example, based on the interrupt signal 422 or 424 related to frame transmission, the software related to the camera module may adjust settings (e.g., tuning an exposure) of the image sensor 201 to obtain a subsequent frame. For example, the image control circuit 203 may transmit the third frame to the image signal processor 207 during a second transmission interval 442. For example, the image control circuit 203 may transmit the fourth frame to the image signal processor 207 during a third transmission interval 444.

According to various embodiments, the electronic device (e.g., the image control circuit 203) may identify the number of frames (e.g., untransmitted frames) that are not transmitted to the image signal processor (e.g., the sub-processor 123 or the image signal processor 207) among the frames obtained from the image sensor (e.g., the camera module 180 or the image sensor 201) in operation 305. According to an embodiment, the image control circuit 203 may identify the number of untransmitted frames based on the difference between the number of frames obtained from the image sensor 201 and the number of frames transmitted to the image signal processors 207. For example, the number of untransmitted frames may include the number of frames or frame pairs that are not transmitted to the image signal processor 207. For example, as illustrated in FIG. 5, in the case that the image control circuit 203 receives a $17^{th}$ frame and/or $18^{th}$ frame from the image sensor 201 when transmitting a pair of $7^{th}$ and $8^{th}$ frames to the image signal processor 207, the image control circuit 203 may determine that the number of untransmitted frames is 8 or four pairs (e.g., $9^{th}$ frame to $16^{th}$ frame).

According to various embodiments, the electronic device (e.g., the image control circuit 203) may identify whether the number of untransmitted frames satisfies a designated number in operation 307. For example, in the case that the number of untransmitted frames exceeds the designated number, the image control circuit 203 may determine that the designated number is satisfied. For example, in the case that the number of untransmitted frames is less than or equal to the designated number, the image control circuit 203 may determine that the designated number is not satisfied. For example, the designated number is a reference number to set the point in time of removing a frame, and may be fixed for the electronic device 200 or may be changed based on an application program.

According to various embodiments, the electronic device (e.g., the image control circuit 203) may remove an untransmitted frame in the case that the number of untransmitted frames satisfies the designated number (e.g., 'Yes' in operation 307) in operation 309. According to an embodiment, as illustrated in FIG. 5, in the case that the image control circuit 203 receives the $17^{th}$ frame and/or the $18^{th}$ frame from the image sensor 201 when transmitting the pair of the $7^{th}$ and $8^{th}$ frames to the image signal processor 207, the image control circuit 203 may remove the $9^{th}$ to $16^{th}$ frames from the memory 205 as shown in diagram 500. Accordingly, the image control circuit 203 may transmit the $8^{th}$ frame to the image signal processor 207 and then may transmit the $17^{th}$ frame the image signal processor 207.

According to various embodiments, in the case that the number of untransmitted frames does not satisfy the designated number (e.g., 'No' in operation 307), the electronic device (e.g., the image control circuit 203) may terminate an algorithm for removing a frame according to an embodiment.

Figure 6:
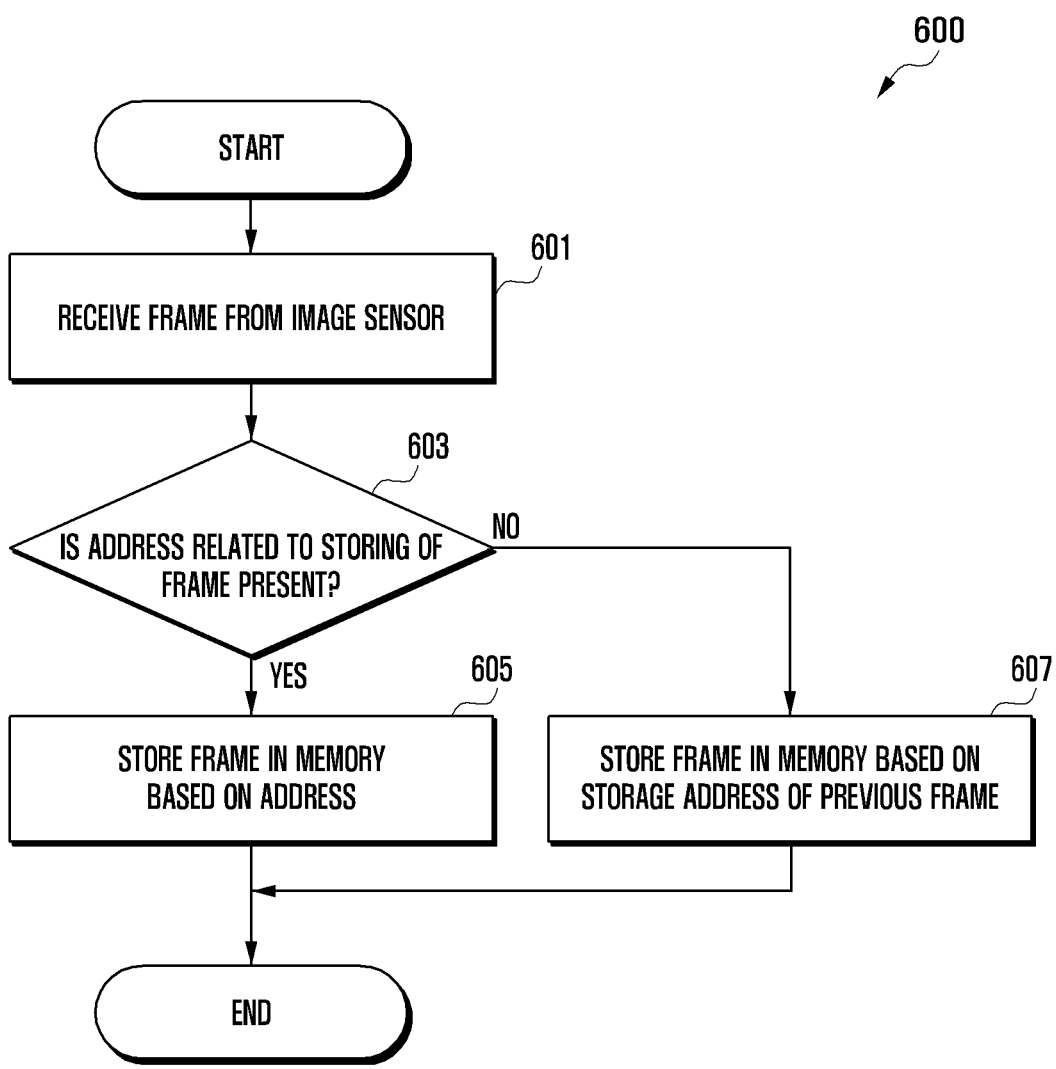
FIG. 6 is a flowchart for storing a frame received from an image sensor by an image control circuit according to various embodiments.

FIG. 6 is a flowchart 600 for storing a frame obtained from an image sensor by an image control circuit according to various embodiments. According to an embodiment, the operations in FIG. 6 may be detailed operations of operation 301 of FIG. 3. In the embodiment provided hereinafter, operations may be performed sequentially but it is not necessary. For example, the order of operations may be changed, and at least two operations may be performed in parallel. For example, an electronic device of FIG. 6 may be the electronic device 101 of FIG. 1 or the electronic device 200 of FIG. 2. For example, an image control circuit of FIG. 6 may be the image control circuit 203 of FIG. 2.

Referring to FIG. 6, according to various embodiments, the electronic device (e.g., the image control circuit 203) may receive at least one frame from an image sensor (e.g., the camera module 180 of FIG. 1 or the image sensor 201 of FIG. 2) in operation 601. According to an embodiment, in the case that a multi-frame mode is supported, the image control circuit 203 may receive a pair of frames (e.g., a long exposure frame and a short exposure frame) related to an image having a high dynamic range from the image sensor 201 during a single frame interval.

According to various embodiments, the electronic device (e.g., the image control circuit 203) may identify whether an address related to storing of a frame is present in operation 603. According to an embodiment, software related to a camera module may select an address of the memory 205 for storing a subsequent frame based on an interrupt signal that is related to storing of a frame and is obtained from the image control circuit 203. For example, as illustrated in FIG. 4B, the image control circuit 203 may store a third frame and a fourth frame in the memory 205 and then may output the interrupt signal 416 related to storing of the pair of frames (e.g., the third frame and the fourth frame). The software related to the camera module may receive the interrupt 416 (e.g., write interrupt (WRITE_IRQ)) output from the image control circuit 203, and may select an address of the memory 205 for storing a fifth frame. In this instance, an address of the memory 205 for storing a sixth frame may not be selected by the software related to the camera module. For example, in the case that the image control circuit 203 receives the fifth frame from the image sensor 201, it is determined that an address related to storing of the fifth frame and selected by the software related to the camera module is present based on the interrupt signal 416 related to storing of a previous frame. For example, in the case that the image control circuit 203 receives the sixth frame from the image sensor 201, it is determined that an address related to storing of the sixth frame is not present.

According to various embodiments, in the case that an address related to storing of the frame received from the image sensor (e.g., the camera module 180 or the image sensor 201) is present (e.g., 'Yes' in operation 603), the electronic device (e.g., the image control circuit 203) may store the frame received from the image sensor (e.g., the camera module 180 or the image sensor 201) in the memory (e.g., the memory 130 of FIG. 1 or the memory 205 of FIG. 2) based on the address related to storing of a frame in operation 605. According to an embodiment, referring to FIG. 4B, the image control circuit 203 may store the fifth frame in the memory 205 based on an address related to storing of the fifth frame, which is selected based on the interrupt signal 416 related to storing of the third frame and the fourth frame.

According to various embodiments, in the case that an address related to storing of the frame received from the image sensor (e.g., the camera module 180 or the image sensor 201) is not present (e.g., 'No' in operation 603), the electronic device (e.g., the image control circuit 203) may store the frame received from the image sensor (e.g., the camera module 180 or the image sensor 201) in the memory (e.g., the memory 130 or 205) based on the address at which a previous frame is stored in operation 607. According to an embodiment, referring to FIG. 4B, the image control circuit 203 may store the sixth frame in the memory 205 based on the address at which the fifth frame that is a previous frame is stored. For example, the sixth frame may be stored in a storing area subsequent to a storage area in which the fifth frame is stored in the memory 205. As another example, the sixth frame may be stored in a storage area subsequent to a storage area in which the fifth frame is stored in the memory 205.

Figure 7:
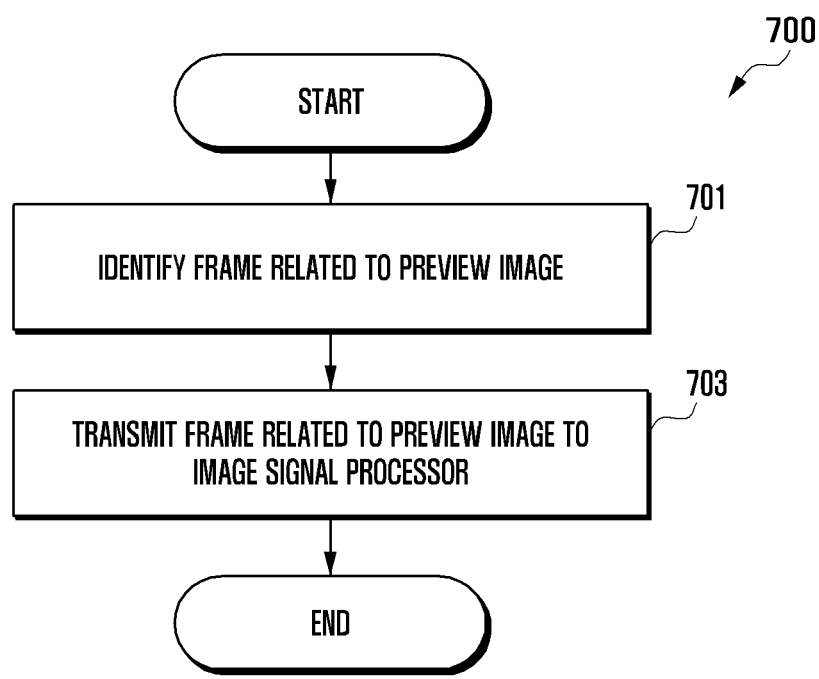
FIG. 7 is a flowchart for transmitting a frame stored in a memory to an image signal processor by an image control circuit according to various embodiments.
Figure 8:
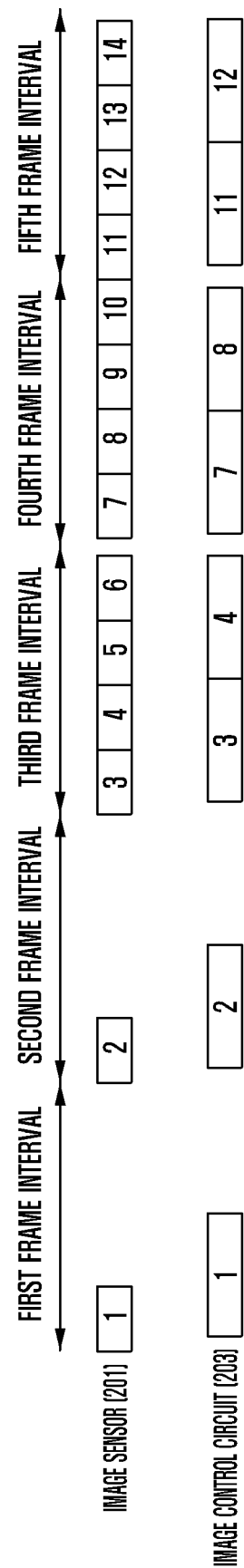
FIG. 8 is a diagram illustrating an example of transmitting a frame stored in a memory to an image signal processor by an image control circuit according to various embodiments.

FIG. 7 is a flowchart 700 for transmitting a frame stored in a memory to an image signal processor, by an image control circuit according to various embodiments. According to an embodiment, the operations in FIG. 7 may be detailed operations of operation 303 of FIG. 3. In the embodiment provided hereinafter, operations may be performed sequentially but it is not necessary. For example, the order of operations may be changed, and at least two operations may be performed in parallel. For example, an electronic device of FIG. 7 may be the electronic device 101 of FIG. 1 or the electronic device 200 of FIG. 2. For example, an image control circuit of FIG. 7 may be the image control circuit 203 of FIG. 2. For example, at least a part of the configuration of FIG. 7 will be described with reference to FIG. 8. FIG. 8 is a diagram illustrating an example of transmitting a frame stored in a memory to an image signal processor by an image control circuit according to various embodiments.

Referring to FIG. 7, according to various embodiments, the electronic device (e.g., the image control circuit 203) may identify at least one frame related to a preview image among frames obtained from an image sensor (e.g., the camera module 180 of FIG. 1 or the image sensor 201 of FIG. 2) during a single frame in operation 701. According to an embodiment, in the case that the image control circuit 203 operates in a multi-frame mode, the image control circuit 203 may obtain a pair of frames (e.g., a third frame and a fourth frame) related to an image having a high dynamic range and at least one frame (e.g., a fifth frame and/or a sixth frame) having an exposure different from the pair of frames during a third frame interval as shown in FIG. 8. For example, the preview image may include an image having a high dynamic range. Accordingly, the image control circuit 203 may detect a pair of frames (e.g., the third frame and the fourth frame) related to an image having a high dynamic range among the frames obtained via the image sensor 201 during the third frame. For example, the at least one frame (e.g., the fifth frame and/or the sixth frame) having an exposure different from the pair of frames may be used to improve the quality of a still image in the case of producing a still image. For example, the fifth frame and/or the sixth frame may include a medium exposure frame obtained via an exposure that is relatively shorter than that of a long exposure frame and that is relatively longer than that of a short exposure frame.

According to various embodiments, the electronic device (e.g., the image control circuit 203) may transmit at least one frame related to the preview image among the frames obtained from the image sensor (e.g., the camera module 180 or the image sensor 201) during a single frame to the image signal processor (e.g., the sub-processor 123 of FIG. 1 or the image signal processor 207 of FIG. 2) in operation 703. According to an embodiment, the image control circuit 203 may sequentially transmit the third frame and the fourth frame that are related to the preview image among the third frame, the fourth frame, the fifth frame, and/or the sixth frame obtained via the image sensor 201 during the third frame interval of FIG. 8 to the image signal processor 207. For example, the fifth frame and/or the sixth frame obtained via the image sensor 201 during the third frame interval may be restricted from being transmitted to the image signal processor 207.

Figure 9:
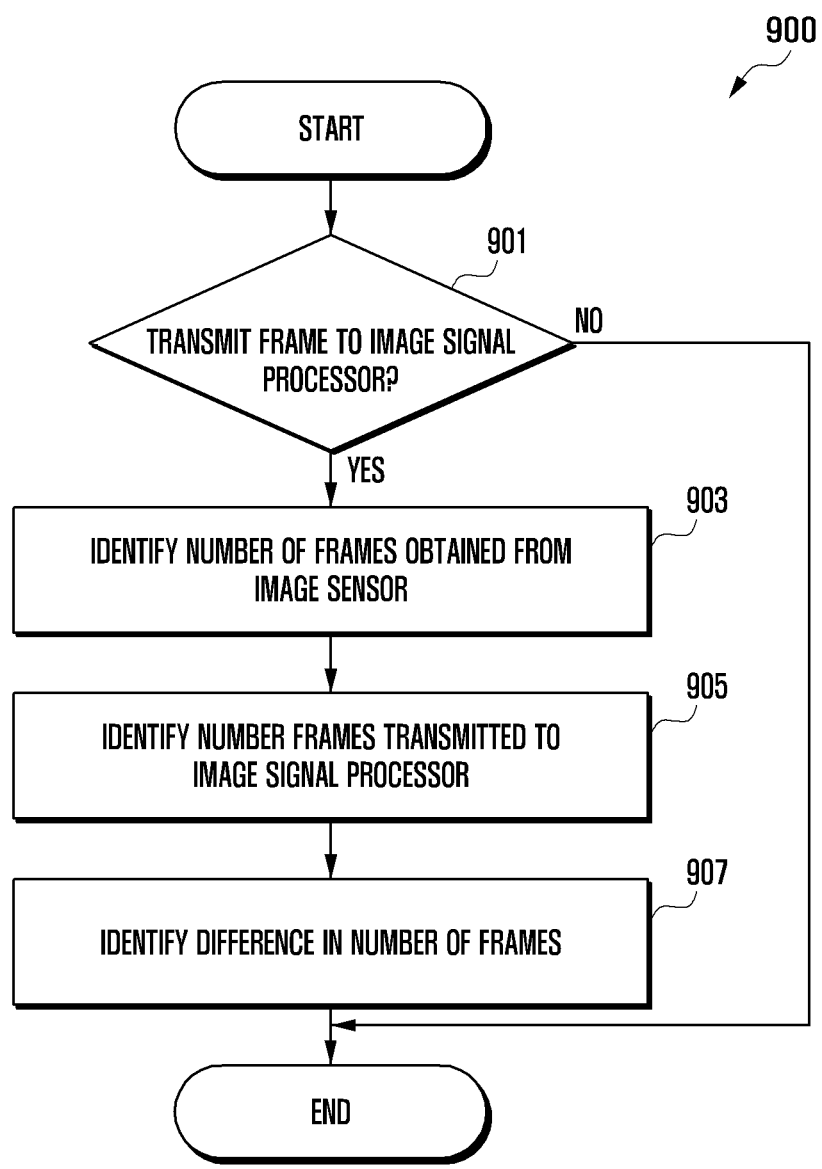
FIG. 9 is a flowchart for identifying the number of frames that are not transmitted to an image signal processor by an image control circuit according to various embodiments.

FIG. 9 is a flowchart 900 for identifying the number of frames that are not transmitted to an image signal processor by an image control circuit according to various embodiments. According to an embodiment, the operations in FIG. 9 may be detailed operations of operation 305 of FIG. 3. In the embodiment provided hereinafter, operations may be performed sequentially but it is not necessary. For example, the order of operations may be changed, and at least two operations may be performed in parallel. For example, an electronic device of FIG. 9 may be the electronic device 101 of FIG. 1 or the electronic device 200 of FIG. 2. For example, an image control circuit of FIG. 9 may be the image control circuit 203 of FIG. 2.

Referring to FIG. 9, according to various embodiments, the electronic device (e.g., the image control circuit 203) may determine whether to transmit a frame to an image signal processor (e.g., the sub-processor 123 of FIG. 1 or the image signal processor 207 of FIG. 2) in operation 901. According to an embodiment, referring to FIG. 5, the image control circuit 203 may transmit a pair of frames (e.g., a $7^{th}$ frame and $8^{th}$ frame) related to an image having a high dynamic range (e.g., a preview image) to the image signal processor 207, and may determine whether to perform an operation of identifying a subsequent frame to be transmitted to the image signal processor 207 in the memory 205. For example, based on a frame processing rate of the image signal processor 207 and the number of frames per second related to driving of an application program, the image control circuit 203 may determine whether to perform an operation of identifying a subsequent frame to be transmitted to the image signal processor 207 in the memory 205.

According to various embodiments, in the case that transmission of a frame to the image signal processor (e.g., the sub-processor 123 or the image signal processor 207) is determined (e.g., 'Yes' in operation 901), the electronic device (e.g., the image control circuit 203) may identify the number of frames obtained from the image sensor (e.g., the camera module 180 of FIG. 1 or the image sensor 201 of FIG. 2) in operation 903. For example, the number of frames obtained from the image sensor 201 may be identified based on the index of a frame received from the image sensor 201 and stored (e.g., the index of a frame stored last). For example, the number of frames obtained from the image sensor 201 may include the number of frames or frame pairs related to an image having a high dynamic range among the frames received from the image sensor 201.

According to various embodiments, the electronic device (e.g., the image control circuit 203) may identify the number of frames transmitted to the image signal processor (e.g., the sub-processor 123 or the image signal processor 207) in operation 905. For example, the number of frames transmitted to the image signal processor 207 may be identified based on the index of a frame transmitted to the image signal processor 207 (e.g., the index of a frame transmitted last). For example, the number of frames transmitted to the image signal processor 207 may include the number of frames or frame pairs that are related to an image having a high dynamic range and are transmitted to the image signal processor 207.

According to various embodiments, the electronic device (e.g., the image control circuit 203) may determine, as the number of untransmitted frames, the difference between the number of frames obtained from the image sensor (e.g., the camera module 180 of FIG. 1 or the image sensor 201 of FIG. 2) and the number of frames transmitted to the image signal processor (e.g., the sub-processor 123 or the image signal processor 207) in operation 907.

According to various embodiments, the electronic device (e.g., the image control circuit 203) may unconditionally store a frame obtained via the image sensor 201 in the memory 205. Accordingly, the image control circuit 203 may determine the number of frames that are not transmitted to the image signal processor 207 at the point in time of transmitting a frame stored in the memory 205 to the image signal processor 207.

Figure 11A:
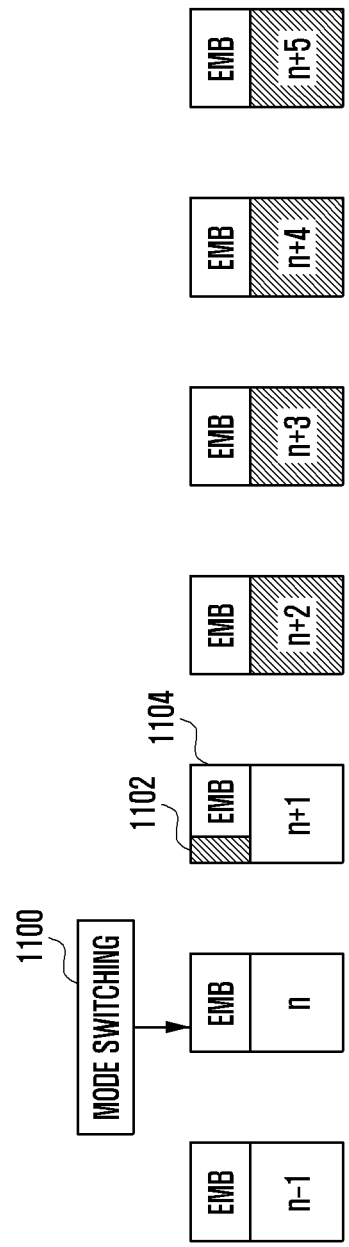
FIGS. 11A and 11B are diagrams illustrating examples of providing information related to switching a shooting mode by an image sensor according to various embodiments.
Figure 11B:
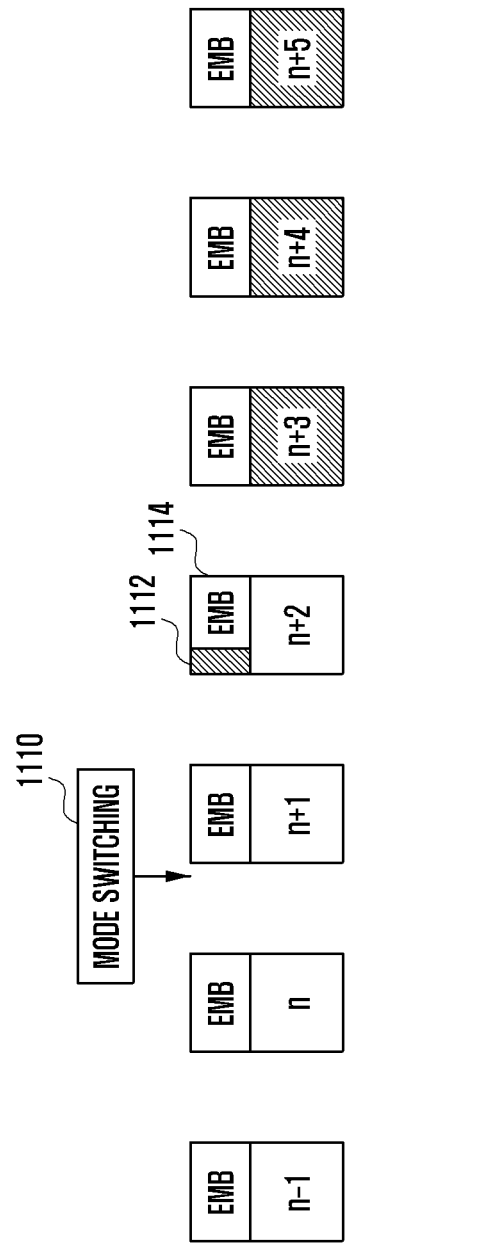

FIG. 10 is a flowchart 1000 for providing information related to switching a shooting mode by an image sensor according to various embodiments. In the embodiment provided hereinafter, operations may be performed sequentially but it is not necessary. For example, the order of operations may be changed, and at least two operations may be performed in parallel. For example, an electronic device of FIG. 10 may be the electronic device 101 of FIG. 1 or the electronic device 200 of FIG. 2. For example, an image sensor of FIG. 10 may be the image sensor 201 of FIG. 2. For example, at least a part of the configuration of FIG. 10 will be described with reference to FIGS. 11A and 11B. FIGS. 11A and 11B are examples of providing information related to switching a shooting mode by an image sensor according to various embodiments.

Referring to FIG. 10, according to various embodiments, the electronic device (e.g., the camera module 180 of FIG. 1 or the image sensor 201 of FIG. 2) may obtain at least one frame according to a first mode (e.g., a single frame mode) in operation 1001. According to an embodiment, in the case that the image sensor 201 operates in a first shooting mode (e.g., a single frame mode), the image sensor 201 may obtain a single frame during the first frame interval 400 and may transmit the same to the image control circuit 203, as illustrated in FIG. 4A and/or FIG. 4B.

According to various embodiments, the electronic device (e.g., the camera module 180 or the image sensor 201) may determine whether to switch the shooting mode to a second shooting mode (e.g., a multi-frame mode) in operation 1003. According to an embodiment, as illustrated in FIG. 11A or FIG. 11B, the image sensor 201 may identify whether a message 1100 or 1110 related to switching to the second shooting mode is received from the main processor 209 (or the image signal processor 207) while obtaining a frame according to the first shooting mode. For example, if it is determined to perform shooting using an image having a high dynamic range based on user input or setting of a camera application program, the main processor 209 may transmit the message 1100 or 1110 related to switching to a multi-frame mode to the image sensor 201. For example, in the case that a message related to switching to the second shooting mode is received, the image sensor 201 may determine to switch to the second shooting mode. For example, in the case that a message related to switching to the second shooting mode is not received, the image sensor 201 may determine to maintain the first shooting mode. For example, a message related to switching to the second shooting mode may be produced by software related to a camera module, the image signal processor 207 and/or the main processor 121.

According to various embodiments, when determining to switch to the second shooting mode (e.g., 'Yes' in operation 1003), the electronic device (e.g., the camera module 180 or the image sensor 201) may identify the point in time of switching to the second shooting mode in operation 1005. According to an embodiment, based on a frame processing structure of at least one component element (e.g., the image control circuit 203, the image signal processor 207, or the main processor 209) of the electronic device 200, the image sensor 201 may determine the point in time of switching to the multi-frame mode. For example, the frame processing structure may include a frame interval needed when at least one component element (e.g., the image control circuit 203, the image signal processor 207, or the main processor 209) of the electronic device 200 prepares a parameter related to processing a subsequent frame. For example, in the case that at least one component element (e.g., the image control circuit 203, the image signal processor 207, or the main processor 209) of the electronic device 200 prepares a parameter related to processing a $n^{th}$ frame, in a $(n-2)^{th}$ frame, the frame processing structure may be referred to as a dual parameter structure. For example, in the case that the frame processing structure is the dual parameter structure, it is determined that the point in time of switching to the multi-frame mode is a second frame (e.g., a $(n+2)^{th}$ frame) from a frame (e.g., a $n^{th}$ frame) in which a message related to switching to the multi-frame mode has been received. For example, as illustrated in FIG. 11A, in the case that the image sensor 201 receives the message 1100 related to switching to the second shooting mode, while transmitting a $n^{th}$ frame to the image control circuit 203, the image sensor 201 may determine that a $(n+2)^{th}$ frame is the point in time of switching to the second shooting mode. For example, the image sensor 201 may begin obtaining according to the second shooting mode from the $(n+2)^{th}$ frame. For example, as illustrated in FIG. 11B, in the case that the image sensor 201 receives the message 1110 related to switching to the second shooting mode, after transmitting a $n^{th}$ frame to the image control circuit 203, the image sensor 201 may determine that a $(n+3)^{th}$ frame is the point in time of switching to the second shooting mode based on a $(n+1)^{th}$ frame. For example, the image sensor 201 may begin obtaining according to the second shooting mode from the $(n+3)^{th}$ frame. For example, the dual parameter structure may include a frame processing structure that at least one component element (e.g., the image control circuit 203, the image signal processor 207, or the main processor 209) of the electronic device 200 prepares a parameter related to processing a subsequent frame while processing the current frame.

According to various embodiments, the electronic device (e.g., the camera module 180 or the image sensor 201) may add the information related to the point in time of switching to the second shooting mode to the frame that the image sensor (e.g., camera module 180 or the image sensor 201) obtains according to the first shooting mode, and may transmit the same to the image control circuit 203 in operation 1007. According to an embodiment, as illustrated in FIG. 11A, if it is determined that the $(n+2)^{th}$ frame is the point in time of switching to the second shooting mode, the image sensor 201 may add information 1102 related to the point in time of switching to the second shooting mode to the $(n+1)^{th}$ frame. For example, the information 1102 related to the point in time of switching to the second shooting mode may be added to a metadata area 1104 (e.g., embedded data (EMB)) of the $(n+1)^{th}$ frame. According to an embodiment, as illustrated in FIG. 11B, if it is determined that the $(n+3)^{th}$ frame is the point in time of switching to the second shooting mode, the image sensor 201 may add information 1112 related to the point in time of switching to the second shooting mode to the $(n+2)^{th}$ frame. For example, the information 1112 related to the point in time of switching to the second shooting mode may be added to a metadata area 1114 of the $(n+2)^{th}$ frame.

According to an embodiment, the magnitude of information related to the point in time of switching a mode may be set based on a parameter changeable in the image sensor 201. For example, in the case that a bit depth, a resolution, the number of frames per second (FPS), and/or a readout speed are capable of being changed in the image sensor 201, the magnitude of the information related to the point in time of switching a mode may be configured with four bits corresponding to the respective parameters. For example, in the case of information related to the point in time of switching to the multi-frame mode, a bit corresponding to a readout speed may be set to a changed state (e.g., '1').

According to various embodiments, in the case that the point in time of switching to the second shooting mode has arrived, the electronic device (e.g., the camera module 180 or the image sensor 201) may obtain at least one frame according to the second shooting mode (e.g., the multi-frame mode) in operation 1009. According to an embodiment, in the case that the mode is switched to the second shooting mode (e.g., the multi-frame mode), the image sensor 201 may obtain a pair of frames (e.g., a third frame and a fourth frame) related to an image having a high dynamic range from the third frame interval 410 as illustrated in FIG. 4B, and may transmit the same to the image control circuit 203.

According to various embodiments, the image sensor 201 may switch the mode to the second shooting mode based on a message related to switching to the second shooting mode. The image sensor 201 may transmit a frame including information related to the point in time of switching to the second shooting mode to the image control circuit 203 based on the switch to the second shooting mode. According to an embodiment, the image sensor 201 may be switched to the second shooting mode after transmitting a frame including information related the point in time of switching to the second shooting mode to the image control circuit 203.

According to various embodiments, in the case that operation is performed in the multi-frame mode, the image sensor 201 may add information related to a subsequent frame to a frame transmitted to the image control circuit 203. According to an embodiment, referring to FIG. 4B, the image sensor 201 may add exposure information of a fourth frame (e.g., a short exposure frame) that is a subsequent frame to a third frame (e.g., a long exposure frame) of the third frame interval 410, and may transmit the same to the image control circuit 203. The image sensor 201 may add exposure information of a fifth frame (e.g., a long exposure frame) that is a subsequent frame to a fourth frame (e.g., a short exposure frame), and may transmit the same to the image control circuit 203.

According to various embodiments, at least one component element (e.g., the image control circuit 203 or the image signal processor 207) of the electronic device 200 may recognize the point in time of switching to the second shooting mode based on information that is related to the point in time of switching a mode of a frame and is provided from the image sensor 201.

According to various embodiments, an operation method of an electronic device (e.g., the electronic device 101 of FIG. 1 or the electronic device 200 of FIG. 2) may include an operation of storing a plurality of frames obtained via an image sensor (e.g., the camera module 180 of FIG. 1 or the image sensor 201 of FIG. 2) of the electronic device in a memory (e.g., the memory 130 of FIG. 1 or the memory 205 of FIG. 2) of the electronic device, an operation of transmitting the plurality of frames stored in the memory to an image signal processor (e.g., the sub-processor 123 of FIG. 1 or the image signal processor 207 of FIG. 2), and in the case that the number of frames that are not transmitted to the image signal processor among the plurality of frames obtained from the image sensor exceeds a designated number, an operation of removing, from the memory, the frames that are not transmitted to the image signal processor.

According to various embodiments, the operation of transmitting to the image signal processor may include an operation of transmitting a first frame corresponding to a first exposure and a second frame corresponding to a second exposure different from the first exposure, which are related to image composition among the plurality of frames obtained via the image sensor during a first frame interval, to the image signal processor.

According to various embodiments, the method may further include an operation of restricting transmission of at least one third frame corresponding to a third exposure different from the first exposure and the second exposure to the image signal processor, from among the plurality of frames obtained via the image sensor during the first frame interval.

According to various embodiments, the method may further include an operation of producing an interrupt signal related to storing of a first frame and a second frame in the case that the first frame corresponding to a first exposure and the second frame corresponding to a second exposure different from the first exposure, which are obtained from the image sensor during a first frame interval, are stored in the memory.

According to various embodiments, the method may further include an operation of selecting an address of the memory related to storing of a subsequent frame based on the interrupt signal, and an operation of storing a fourth frame corresponding to the first exposure and a fifth frame corresponding to the second exposure, which are obtained from the image sensor during a second frame interval, in the memory based on the selected address.

According to various embodiments, the operation of removing from the memory may include, in the case that a frame to be transmitted to the image signal processor from among the frames stored in the memory is identified, an operation of identifying a difference between an index of a frame received from the image sensor and an index of a frame transmitted to the image signal processor, and an operation of removing, from the memory, a frame that is not transmitted to the image signal processor among the plurality of frames obtained from the image sensor in the case that the difference between the index of the frame received from the image sensor and the index of the frame transmitted to the image signal processor exceeds the designated number.

According to various embodiments, the method may further include an operation of sequentially transmitting the plurality of frames obtained via the image sensor in order of frames obtained, in the case that the number of frames that are not transmitted to the image signal processor among the plurality of frames obtained from the image sensor is less than or equal to the designated number.

According to various embodiments, the frame received via the image sensor may include information related to an exposure of a subsequent frame.

According to various embodiments, the method may further include an operation of producing a single image by combining a first frame corresponding to a first exposure and a second frame corresponding to a second exposure different from the first exposure by the image signal processor.

According to various embodiments, the method may further include an operation of displaying the image produced by the image signal processor.

Embodiments of the present disclosure provided in the present specifications and drawings merely are certain examples to readily describe the technology associated with embodiments of the present disclosure and to help understanding of the embodiments of the present disclosure, but may not limit the scope of the embodiments of the present disclosure. Therefore, in addition to the embodiments disclosed herein, the scope of the various embodiments of the present disclosure should be construed to include all modifications or modified forms drawn based on the technical idea of the various embodiments of the present disclosure.

What is claimed is:

1. An electronic device comprising:
a memory;
an image sensor;
an image control circuit operatively connected to the image sensor; and
an image signal processor operatively connected to the image control circuit,
wherein the image control circuit is configured to:
store a plurality of frames received via the image sensor in the memory;
transmit at least one of the plurality of frames stored in the memory to the image signal processor; and
identify a difference value between an index of a frame received from the image sensor and an index of the at least one frame transmitted to the image signal processor; and
remove a frame that is not transmitted to the image signal processor among the plurality of frames stored in the memory based on a determination that the identified difference value between the index of the frame received from the image sensor and the index of the at least one frame transmitted to the image signal processor exceeds a designated number.

2. The electronic device of claim 1, wherein the image control circuit is configured to transmit a first frame corresponding to a first exposure and a second frame corresponding to a second exposure different from the first exposure, which are related to image composition from among the plurality of frames received from the image sensor during a first frame interval, to the image signal processor.

3. The electronic device of claim 2, wherein the image control circuit is configured to restrict transmission of at least one third frame that corresponds to a third exposure different from the first exposure and the second exposure to the image signal processor from among the plurality of frames received from the image sensor during the first frame interval.

4. The electronic device of claim 1, wherein the image control circuit is configured to produce an interrupt signal related to storing of a first frame and a second frame based on storing the first frame corresponding to the first exposure and a second frame corresponding to a second exposure different from the first exposure, which are received from the image sensor during the first frame interval, in the memory.

5. The electronic device of claim 4, wherein the image signal processor is configured to select an address of the memory related to storing of a subsequent frame based on the interrupt signal, and
wherein the image control circuit is configured to store a fourth frame corresponding to the first exposure and a fifth frame corresponding to the second exposure, which are received from the image sensor during a second frame interval, in the memory based on the address selected by the image signal processor.

6. The electronic device of claim 1, wherein the image control circuit is configured to sequentially transmit the at least one of the plurality of frames received from the image sensor in order of frames received to the image signal processor based on a determination that the identified difference value between the index of the frame received from the image sensor and the index of the at least one frame transmitted to the image signal processor is less than or equal to the designated number.

7. The electronic device of claim 1, further comprising a display,
wherein the image signal processor is configured to produce a single image by combining the first frame corresponding to the first exposure and the second frame corresponding to the second exposure different from the first exposure, which are provided from the image control circuit, and
wherein the display is configured to display the image produced by the image signal processor.

8. An operation method of an electronic device, the method comprising:
storing a plurality of frames obtained via an image sensor of the electronic device in a memory of the electronic device;
transmitting at least one of the plurality of frames stored in the memory to an image signal processor;
identifying a difference value between an index of a frame received from the image sensor and an index of the at least one frame transmitted to the image signal processor; and
removing the frames that are not transmitted to the image signal processor among the plurality of frames stored in the memory based on a determination that the identified difference value between the index of the frame received from the image sensor and the index of the at least one frame transmitted to the image signal processor exceeds a designated number.

9. The method of claim 8, wherein the transmitting to the image signal processor comprises transmitting a first frame corresponding to a first exposure and a second frame corresponding to a second exposure different from the first exposure, which are related to image composition among the plurality of frames obtained via the image sensor during a first frame interval, to the image signal processor.

10. The method of claim 9, further comprising restricting transmission of at least one third frame corresponding to a third exposure different from the first exposure and the second exposure to the image signal processor from among the plurality of frames obtained via the image sensor during the first frame interval.

11. The method of claim 8, further comprising producing an interrupt signal related to storing of a first frame and a second frame based on storing the first frame corresponding to a first exposure and the second frame corresponding to a second exposure different from the first exposure, which are obtained from the image sensor during a first frame interval, in the memory.

12. The method of claim 11, further comprising selecting, based on the interrupt signal, an address of the memory related to storing of a subsequent frame, and
storing a fourth frame corresponding to the first exposure and a fifth frame corresponding to the second exposure, which are obtained from the image sensor during a second frame interval, in the memory based on the selected address.

13. The method of claim 8, further comprising sequentially transmitting at least one of the plurality of frames obtained via the image sensor in order of frames obtained to the image signal processor based on a determination that the identified difference value between the index of the frame received from the image sensor and the index of the at least one frame transmitted to the image signal processor is less than or equal to the designated number.

14. An electronic device comprising:
an image sensor;
an image signal processor; and
at least one processor operatively connected to the image sensor and the image signal processor, wherein the at least one processor is configured to:
obtain frames via an image sensor;
transmit a number of the frames to the image signal processor;
identify a difference value between an index of a frame received from the image sensor and indexes of the number of frames transmitted to the image signal processor and
discard at least one frame that is not transmitted to the image signal processor based on a determination that the difference value between the index of the frame received from the image sensor and the indexes of the number of frames transmitted to the image signal processor exceeds a designated number.

15. The electronic device of claim 14, wherein the at least one processor is further configured to:
transmit a first frame corresponding to a first exposure and a second frame corresponding to a second exposure different from the first exposure, which are related to image composition during a first frame interval, to the image signal processor; and
restrict transmission of at least one third frame corresponding to a third exposure different from the first exposure and the second exposure to the image signal processor from among the frames obtained during the first frame interval.

16. The electronic device claim 14, further comprising:
a memory,
wherein the at least one processor is further configured to:
produce an interrupt signal related to storing of a first frame and a second frame based on storing the first frame corresponding to a first exposure and the second frame corresponding to a second exposure different from the first exposure, which are obtained from the image sensor during a first frame interval, in the memory;
select, based on the interrupt signal, an address of the memory related to storing of a subsequent frame; and
store a fourth frame corresponding to the first exposure and a fifth frame corresponding to the second exposure, which are obtained during a second frame interval, in the memory based on the selected address.

17. The electronic device claim 14, wherein the at least one processor is further configured to:
sequentially transmit the frames in order of frames obtained to the image signal processor based on a determination that the difference value between the index of the frame received from the image sensor and the indexes of the number of frames transmitted to the image signal processor is less than or equal to the designated number.

* * * * *